United States Patent
Chapoy et al.

(10) Patent No.: US 6,808,262 B2
(45) Date of Patent: Oct. 26, 2004

(54) MULTIFOCAL CONTACT LENS WITH ASPHERIC SURFACE

(75) Inventors: L. Lawrence Chapoy, Barrington Hills, IL (US); William Rovani, Mount Prospect, IL (US); John B. W. Lett, San Diego, CA (US)

(73) Assignee: Novartis AG, Basel (CH)

( * ) Notice: Subject to any disclaimer, the term of this patent is extended or adjusted under 35 U.S.C. 154(b) by 120 days.

(21) Appl. No.: 09/881,548

(22) Filed: Jun. 14, 2001

(65) Prior Publication Data

US 2002/0036748 A1 Mar. 28, 2002

Related U.S. Application Data

(63) Continuation of application No. PCT/US99/29917, filed on Dec. 15, 1999.
(60) Provisional application No. 60/112,454, filed on Dec. 16, 1998.

(51) Int. Cl.[7] .................................. G02C 7/04
(52) U.S. Cl. ....................................... 351/161
(58) Field of Search .......................... 351/161

(56) References Cited

U.S. PATENT DOCUMENTS

| | | |
|---|---|---|
| 1,955,047 A | 4/1934 | Beach |
| 2,405,989 A | 8/1946 | Beach |
| 2,869,422 A | 1/1959 | Cretin-Maitenaz |
| 3,004,470 A | 10/1961 | Rühle |
| 3,031,927 A | 5/1962 | Wesley |
| 3,034,403 A | 5/1962 | Neefe |
| 3,037,425 A | 6/1962 | De Carle |
| RE25,286 E | 11/1962 | De Carle |
| 3,279,878 A | 10/1966 | Long |
| 3,298,771 A | 1/1967 | Ratliff |
| 3,472,581 A | 10/1969 | Bronstein |
| 3,482,906 A | 12/1969 | Volk |
| 3,614,218 A | 10/1971 | Bronstein |
| 3,623,800 A | 11/1971 | Volk |
| 3,662,040 A | 5/1972 | Urbach et al. |
| 3,711,191 A | 1/1973 | Tagnon |
| 3,726,587 A | 4/1973 | Kendall |
| 3,794,414 A | 2/1974 | Wesley |
| 3,866,249 A | 2/1975 | Flom |
| 3,937,566 A | 2/1976 | Townsley |
| 3,950,082 A | 4/1976 | Volk |
| 4,010,496 A | 3/1977 | Neefe |
| RE29,229 E | 5/1977 | Girard et al. |
| 4,055,378 A | 10/1977 | Feneberg et al. |
| 4,073,579 A | 2/1978 | Deeg et al. |
| 4,153,349 A | 5/1979 | Wichterle |
| 4,162,122 A | 7/1979 | Cohen |
| 4,195,919 A | 4/1980 | Shelton |
| 4,199,231 A | 4/1980 | Evans |
| 4,210,391 A | 7/1980 | Cohen |
| 4,262,370 A | 4/1981 | Hartstein |
| 4,274,717 A | 6/1981 | Davenport |

(List continued on next page.)

FOREIGN PATENT DOCUMENTS

| | | |
|---|---|---|
| AU | A 52069/96 | 11/1996 |
| EP | 0 132 955 A2 | 2/1985 |

(List continued on next page.)

OTHER PUBLICATIONS

Anschutz, T., et al., "Evaluation of Hyperopic Photoablation Profiles", Journal of Refractive Surgery, vol. 14, No. 2 (suppl), Apr. 1998, pp. S192–S196.

(List continued on next page.)

*Primary Examiner*—Scott J. Sugarman
*Assistant Examiner*—Darryl J. Collins
(74) *Attorney, Agent, or Firm*—Jian Zhou; Robert Gorman; R. Scott Meece

(57) ABSTRACT

A contact lens is disclosed having a front surface and a back surface. The lens contains a continuously varying aspheric surface on one or more of these surfaces.

18 Claims, 5 Drawing Sheets

U.S. PATENT DOCUMENTS

| | | | |
|---|---|---|---|
| 4,302,081 A | 11/1981 | Tsuetaki | |
| 4,324,461 A | 4/1982 | Salvatori | |
| 4,338,005 A | 7/1982 | Cohen | |
| 4,340,283 A | 7/1982 | Cohen | |
| 4,418,991 A | 12/1983 | Breger | |
| 4,450,593 A | 5/1984 | Poler | |
| 4,466,705 A | 8/1984 | Michelson | |
| 4,484,804 A | 11/1984 | Mignen | |
| 4,504,982 A | 3/1985 | Burk | |
| 4,512,039 A | 4/1985 | Lieberman | |
| 4,525,043 A | 6/1985 | Bronstein | |
| 4,549,794 A | 10/1985 | Loshaek et al. | |
| 4,573,775 A | 3/1986 | Bayshore | |
| 4,573,998 A | 3/1986 | Mazzocco | |
| 4,580,882 A | 4/1986 | Nuchman et al. | |
| 4,581,031 A | 4/1986 | Koziol et al. | |
| 4,582,402 A | 4/1986 | Knapp | |
| 4,593,981 A | 6/1986 | Scilipoti | |
| 4,614,413 A | 9/1986 | Obssuth | |
| 4,636,049 A | 1/1987 | Blaker | |
| 4,636,211 A | 1/1987 | Nielsen et al. | |
| 4,637,697 A | 1/1987 | Freeman | |
| 4,640,595 A | 2/1987 | Volk | |
| 4,642,112 A | 2/1987 | Freeman | |
| 4,666,446 A | 5/1987 | Koziol et al. | |
| 4,668,240 A | 5/1987 | Loshaek | |
| 4,673,406 A | 6/1987 | Schlegel | |
| 4,676,610 A | 6/1987 | Barkan et al. | |
| 4,693,572 A | 9/1987 | Tsuetaki et al. | |
| 4,702,573 A | 10/1987 | Morstad | |
| 4,704,016 A | 11/1987 | De Carle | |
| 4,704,017 A | 11/1987 | Knapp | |
| 4,710,193 A | 12/1987 | Volk | |
| 4,728,182 A | 3/1988 | Kelman | |
| 4,729,651 A | 3/1988 | Kitani | |
| 4,732,148 A | 3/1988 | L'Esperance, Jr. | |
| 4,752,123 A | 6/1988 | Blaker | |
| 4,759,763 A | 7/1988 | Bissonette et al. | |
| 4,769,033 A | 9/1988 | Nordan | |
| 4,784,482 A | 11/1988 | Guillino | |
| 4,813,777 A | 3/1989 | Rainville et al. | |
| 4,813,955 A | 3/1989 | Achatz et al. | |
| 4,861,152 A | 8/1989 | Vinzia et al. | |
| 4,869,587 A | 9/1989 | Breger | |
| 4,874,234 A | 10/1989 | Wichterle | |
| 4,890,912 A | 1/1990 | Visser | |
| 4,890,913 A | 1/1990 | De Carle | |
| 4,898,461 A | 2/1990 | Portney | |
| 4,909,621 A | 3/1990 | Evans | |
| 4,917,681 A | 4/1990 | Nordan | |
| 4,923,296 A | 5/1990 | Erickson | |
| 4,932,970 A | 6/1990 | Portney | |
| 4,936,672 A | 6/1990 | Capez | |
| 4,938,583 A | 7/1990 | Miller | |
| 4,950,057 A | 8/1990 | Shirayanagi | |
| 4,955,712 A | 9/1990 | Barth et al. | |
| 4,971,432 A | 11/1990 | Koeniger | |
| 4,976,534 A | 12/1990 | Miege et al. | |
| 4,988,182 A | 1/1991 | Takahashi et al. | |
| 4,995,715 A | 2/1991 | Cohen | |
| 5,002,382 A | 3/1991 | Seidner | |
| 5,016,977 A | 5/1991 | Baude et al. | |
| 5,019,099 A | 5/1991 | Nordan | |
| 5,024,517 A | 6/1991 | Seidner | |
| 5,050,095 A | 9/1991 | Samad | |
| 5,071,244 A | 12/1991 | Ross | |
| 5,074,877 A | 12/1991 | Nordan | |
| 5,076,683 A | 12/1991 | Glick | |
| 5,080,472 A | 1/1992 | Gupta | |
| 5,106,180 A | 4/1992 | Marie et al. | |
| 5,112,351 A | 5/1992 | Christie et al. | |
| 5,125,729 A | 6/1992 | Mercure | |
| 5,129,718 A | 7/1992 | Futhey et al. | |
| 5,139,325 A | 8/1992 | Oksman et al. | |
| 5,141,301 A | 8/1992 | Morstad | |
| 5,158,572 A | 10/1992 | Nielsen | |
| 5,166,711 A | 11/1992 | Portney | |
| 5,166,712 A | 11/1992 | Portney | |
| 5,170,192 A | 12/1992 | Pettigrew et al. | |
| 5,181,053 A | 1/1993 | Brown | |
| 5,198,844 A | 3/1993 | Roffman et al. | |
| 5,220,359 A | 6/1993 | Roffman | |
| 5,225,858 A | 7/1993 | Portney | |
| 5,235,359 A | 8/1993 | Chauveau et al. | |
| 5,245,366 A | 9/1993 | Svochak | |
| 5,270,744 A | 12/1993 | Portney | |
| 5,270,745 A | 12/1993 | Pedrono | |
| 5,272,495 A | 12/1993 | Pedrono | |
| 5,278,592 A | 1/1994 | Marie et al. | |
| 5,296,880 A | 3/1994 | Webb | |
| 5,302,978 A | 4/1994 | Evans et al. | |
| 5,326,348 A | 7/1994 | Nordan | |
| 5,344,447 A | 9/1994 | Swanson | |
| 5,349,394 A | 9/1994 | Freeman et al. | |
| 5,395,356 A | 3/1995 | King et al. | |
| 5,404,183 A | 4/1995 | Seidner | |
| 5,406,341 A | 4/1995 | Blum et al. | |
| 5,408,281 A * | 4/1995 | Zhang | 351/161 |
| 5,422,687 A | 6/1995 | Tanaka et al. | |
| 5,430,504 A | 7/1995 | Muckenhirn et al. | |
| 5,436,678 A | 7/1995 | Carroll | |
| 5,446,508 A | 8/1995 | Kitchen | |
| 5,483,304 A | 1/1996 | Porat | |
| 5,485,228 A | 1/1996 | Roffman et al. | |
| 5,493,350 A | 2/1996 | Seidner | |
| 5,500,024 A | 3/1996 | Hung et al. | |
| 5,517,260 A | 5/1996 | Glady et al. | |
| 5,521,656 A | 5/1996 | Portney | |
| 5,526,071 A | 6/1996 | Seidner et al. | |
| 5,528,321 A | 6/1996 | Blum et al. | |
| 5,530,491 A | 6/1996 | Baude et al. | |
| 5,532,768 A | 7/1996 | Onogi et al. | |
| 5,541,678 A | 7/1996 | Awanohara et al. | |
| 5,574,518 A | 11/1996 | Mercure | |
| 5,608,471 A | 3/1997 | Miller | |
| 5,618,284 A | 4/1997 | Sand | |
| 5,619,289 A | 4/1997 | Seidner et al. | |
| 5,650,838 A | 7/1997 | Roffman et al. | |
| 5,652,638 A | 7/1997 | Roffman et al. | |
| 5,657,108 A | 8/1997 | Portney | |
| 5,682,223 A | 10/1997 | Menezes et al. | |
| 5,684,560 A | 11/1997 | Roffman et al. | |
| 5,691,797 A | 11/1997 | Seidner et al. | |
| 5,702,440 A | 12/1997 | Portney | |
| 5,715,031 A | 2/1998 | Roffman et al. | |
| 5,724,120 A | 3/1998 | Svochak et al. | |
| 5,754,270 A | 5/1998 | Rehse et al. | |
| 5,771,088 A * | 6/1998 | Perrott | 351/161 |
| 5,779,696 A | 7/1998 | Berry et al. | |
| 5,796,462 A | 8/1998 | Roffman et al. | |
| 5,798,817 A | 8/1998 | De Carle | |
| 5,803,923 A | 9/1998 | Singh-Derewa et al. | |
| 5,805,260 A | 9/1998 | Roffman et al. | |
| 5,812,237 A | 9/1998 | Roddy | |
| 5,815,236 A | 9/1998 | Vayntraub | |
| 5,815,237 A | 9/1998 | Vayntraub | |
| 5,827,264 A | 10/1998 | Hohla | |
| 5,831,713 A | 11/1998 | Fritsch et al. | |
| 5,835,187 A | 11/1998 | Martin | |
| 5,847,802 A | 12/1998 | Menezes et al. | |
| 5,864,379 A | 1/1999 | Dunn | |

| | | | |
|---|---|---|---|
| 5,864,380 A | | 1/1999 | Umeda |
| 5,872,613 A | | 2/1999 | Blum et al. |
| 5,877,839 A | | 3/1999 | Portney |
| 5,891,132 A | | 4/1999 | Hohla |
| 5,898,473 A | | 4/1999 | Seidner et al. |
| 5,910,832 A | | 6/1999 | Roddy |
| 5,919,229 A | | 7/1999 | Portney |
| 5,935,140 A | | 8/1999 | Buratto |
| 5,992,998 A | | 11/1999 | Pfeiffer et al. |
| 6,109,749 A | * | 8/2000 | Bernstein ................... 351/161 |

FOREIGN PATENT DOCUMENTS

| | | |
|---|---|---|
| EP | 0 138 394 A2 | 4/1985 |
| EP | 0 201 231 A2 | 12/1986 |
| EP | 0 307 876 A2 | 3/1989 |
| EP | 0 445 994 A2 | 9/1991 |
| EP | 0 453 136 A2 | 10/1991 |
| EP | 0 574 590 A1 | 12/1993 |
| GB | 939016 | 10/1963 |
| GB | 2 086 605 A | 5/1982 |
| GB | 2 129 155 A | 5/1984 |
| GB | 2 139 375 A | 11/1984 |
| WO | WO 87/00299 | 6/1985 |
| WO | WO 86/03961 | 12/1985 |
| WO | WO 92/22264 | 12/1992 |
| WO | WO 93/25170 | 12/1993 |
| WO | WO 97/12272 | 4/1997 |
| WO | WO 98/18522 | 5/1998 |
| WO | WO 99/07440 | 2/1999 |
| WO | WO 99/44492 | 9/1999 |

OTHER PUBLICATIONS

Arbelaez, M., et al., "Laser in situ Keratomileusis for Hyperopia and Hyperopic Astigmatism," Journal of Refractive Surgery, vol. 15, Jul./Aug. 1999, pp. 406–413.

Barraquer, C., et al., "Results of laser in situ keratomileusis in hyperopic compound astigmatism," J. Cataract Refractive Surgery, vol. 25, Sep. 1999, pp. 1198–1204.

Bier, N., "Prescribing for Presbyopia with Contact Lenses", Opthalmic Optician, vol. 5, No. 9, pp. 439–442 and 447–454, May 1, 1965.

Bronstein, L., "Reverse Centrad Bifocal Contact Lenses," Optometric Weekly, vol. 59, No. 25, pp. 45–48 Jun. 20, 1968.

Buzard, K., et al., "Excimer laser assisted in situ keratomileusis for hyperopia", J. Cataract Refractive Surgery, Vo. 26, Feb. 1999, pp. 197–203.

Chayet, A., et al., "Laser in situ Keratomileusis for Simple Myopic, Mixed, and Simple Hyperopic Astigmatism," Journal of Refractive Surgery, vol. 14, No. 2 (suppl), Apr. 1998, pp. S175–S176.

Cheloudtchenko, V., et al., "Correction of Asymmetric Myopic Astigmatism With Laser in situ Keratomileusis," Journal of Refractive Surgery, vol. 15, Mar./Apr. (suppl) 1999, pp. S192–S194.

Danjoux, J., et al., "Excimer Laser Photorefractive Keratectomy for Hyperopia," Journal of Refractive Surgery, vol. 13, Jul./Aug. 1997, pp. 349–355.

Ditzen, K., et al., "Laser in situ keratomileusis for hyperopia", J. Cataract Refractive Surgery, vol. 24, Jan. 1998, pp. 42–47.

Eggink, C. et al., "Treatment of Hyperopia with Contact Ho: YAG Laser Thermal Keratoplasty," Journal of Refractive Surgery, vol. 15, Jan./Feb. 1999, pp. 16–22.

Evans, T., et al., "A Front Aspheric Hydrogel Contact Lens For The Correction of Presbyopia and Astigma," Reprinted from Optometry Today, Nov. 5, 1988.

Ghorinley, R., "Sunsoft Multifocal—A New Bifocal Contact Lens," ICLC, vol. 23, Mar./Apr. 1996.

Ibrahim, O., "Laser in situ Keratomileusis for Hyperopia and Hyperopic Astigmatism," Journal of Refractive Surgery, vol. 14, No. 2 (suppl), Apr. 1998, pp. S179–S182.

Ismail, M., et al., "Noncontact thermokeratoplasty to correct hyperopia induced by laser in situ keratomilusis," J. Cataract Refract Surg, vol. 24, Sep. 1999, pp. 1191–1194.

Lavery, F., "Laser in situ Keratomileusis for Myopia," Journal of Refractive Surgery, vol. 14, No. 2 (suppl), Apr. 1998, pp. S177–S178.

Molina, R., et al., "Correction of Astigmatism Using Positive and Negative Cylinder Programs with the Nidek EC–5000 Excimer Laser," Journal of Refractive Surgery, vol. 15, Mar./Apr. (suppl) 1999, pp. S195–S196.

Norman, C., et al., "A Soft Approach to Presbyopia," Spectrum, pp. 27–30, Aug. 1995.

Norman, C., et al., "Stressing Success with Your Presbyopic Contact Lens Patients," Spectrum, pp. 29–36, May 1995.

Pence, N., "Strategies For Success With Prebyopes," Spectrum, May 1994.

Shah, S., et al., "Effect of an Elliptical Optical Zone on Outcome of Photoastigmatic Refractive Surgery," Journal of Refractive Surgery, vol. 15, Mar./Apr. (suppl) 1999, pp. S188–S191.

Vinciguerra, P., et al., "Long–term Results of Photorefractive Keratectomy for Hyperopia and Hyperopic Astigmatism," Journal of Refractive Surgery, vol. 14, No. 2 (suppl), Apr. 1998, pp. S183–S185.

Vinciguerra, P., et al., "Radial and staggered treatment patterns to correct hyperopia using noncontact holmium: YAG laser thermal keratoplasty," J. Cataract Refract Surg, vol. 24, Jan. 1998, pp. 21–30.

Vinciguerra, P., et al., "Excimer Laser Photorefractive Keratectomy for Presbyopia: 24–month Follow–up in Three Eyes," Journal of Refractive Surgery, Jan./Feb. 1998, pp. 31–37.

Vinciguerra, P., et al., "Photorefractive Keratectomy to Correct Myopic or Hyperopic Astigmatism With a Cross–cylinder Ablation," Journal of Refractive Surgery, vol. 15, Mar./Apr. (suppl) 1999, pp. S183–S185.

Vinciguerra, P. et al., "Algorithm to Correct Hyperopic Astigmatism with the Nidek EC–5000 Excimer Laser," Journal of Refractive Surgery, vol. 15, Mar./Apr. (suppl) 1999, pp. S186–S187.

Wesley, N., "Analysis of Biofocal Contact Lenses," pp. 926–931, Am. J. Optometry and Arch. Am. Ac. Optometry, Nov. 1971.

Wu, Corrina, "Contacts for Aging Baby Boomers'Eyes?", Science News, vol. 150, p. 159, Sep. 7, 1996.

International Search Report dated Feb. 4, 2000, for Patent Cooperation Treaty application No. PCT/US99/29917, 1 page.

* cited by examiner

RAY TRACING TO CALCULATE ADD AS A FUNCTION OF HALF CHORD DIAMETER

MULTIFOCAL CONTACT LENS WITH ASPHERIC SURFACE

The application is a continuation of and claims the benefit of filing date pursuant to 35 U.S.C. §120 of PCT Application No. PCT/US99/29917, filed Dec. 15, 1999, which claims the benefit of Provisional Application Serial No. 60/112,454, filed Dec. 16, 1998, the disclosure of which is hereby incorporated by reference.

BACKGROUND OF THE INVENTION

The present invention relates to an improved lens design. More specifically, the present invention relates to an improved multifocal lens using one or more aspheric surfaces for vision correction.

A spherical lens has a front and back surface with each surface having a constant radius of curvature. The focal power of the spherical lens is also constant. As you move along the lens in a radial direction from the center point to the periphery, the optical power of the spherical lens does not change except for smaller order effects due to optical aberration.

An aspheric lens on the other hand has a non-constant radius of curvature on one or both of its front and back surfaces. The focal power of the aspheric lens changes as you move along the radius of the lens. This feature is the basis for a multifocal vision correcting lens.

The degree to which an aspheric lens departs from a spherical lens is measured by the eccentricity parameter e. If e=0, the lens has a spherical surface. If e=1 the lens has a parabolic surface; if e>1 the lens has a hyperbolic surface, and if e<1 the lens has an elliptical surface.

One use of the aspheric lens, particularly a contact lens, is to correct presbyopia (a vision condition associated with age). Over time the presbyopic patient loses visual accommodation (i.e., the ability of the eye to change optical power in order to adjust focus for different viewing distances) such that objects at near or intermediate viewing distances are not seen clearly without the aid of a near power lens. The aspheric lens compensates for presbyopia by providing a range of optical power including that required for far, near, and intermediate viewing distances. Generally, by increasing the eccentricity e, the range of optical power provided by the aspheric lens increases such that the value of e may in principle be adjusted for early or advanced presbyopia. However, there appears to be a maximum eccentricity value which is useful. With current designs with e values below approximately 0.8, additional near power of up to approximately +1.50 D is possible. This is suitable for early to moderate presbyopia. For moderate to advanced presbyopia +1.50 to +2.50 D (or more) of additional near power are required. However, if the eccentricity e is increased above approximately 0.8 to provide this increased level of additional near power, it is found that the quality of distance vision becomes so compromised as to be unacceptable to most patients.

In U.S. Pat. No. 4,704,016, a multifocal contact lens is disclosed. The major viewing area of the lens is divided into a multiplicity of near and distant vision viewing zones. The wearer is able to simultaneously look through at least two zones of different power. One way of creating the zones is to form a series of concentric rings using a lathe. The annular area of the lens is cut alternately for distant and for near vision correction. The eccentricity of the surface is varied in dependence on the radius but there is no dependence on the equatorial angle $\phi$. Another technique disclosed in the patent is to incorporate segments of material having a different refractive index from that of the body of the lens. The eccentricity of these lenses is also independent of the equatorial angle $\phi$. These lenses do not solve the problem of channeling too much light into the near vision portion of the lens.

U.S. Pat. No. 4,898,461 discloses a lens similar to U.S. Pat. No. 4,704,016. Like the foregoing disclosure the lens has a plurality of alternating focal power zones. Here, the focal power varies continuously in the radial direction within each zone and in the transition area between each zone. The eccentricity of these lenses is independent of the equatorial angle $\phi$. These lenses also do not solve the problem of channeling too much light into the near vision portion of the lens.

Another contact lens design has been proposed for achieving near and distant vision correction known as the translating design. Translating designs attempt to exploit the fact that when a wearer looks down to read, a contact lens rides up on the wearer's cornea. Translating designs thus attempt to place an optical zone with the distance power over the pupil of the eye when the patient is looking straight ahead and an optical zone with the near power over the pupil when the patient is looking down to read. However, sufficient and reliable translation has not been achieved to make the lens satisfactory in most applications. Also, the comfort of translating designs is often unacceptable to many patients.

There is a need for an improved multifocal lens which eliminates some or all of these problems found in the prior art lens designs.

SUMMARY OF THE INVENTION

The present invention provides, according to a first aspect, a contact lens having a front surface, a back surface and an apex. The lens defines a series of adjacent points at a fixed distance from the apex. The series of adjacent points on the lens having a continuously varying power, the series of adjacent points extending across an arc of at least 120°.

According to another aspect of the invention, the contact lens includes a front surface and a back surface. One of the front surface and the back surface is an aspheric surface wherein the eccentricity varies continuously as a function of the angle $\phi$.

According to yet another aspect of the invention, a bottom portion of the lens has an eccentricity that varies continuously as a function of the angle $\phi$ and a top portion of the lens has a substantially constant eccentricity as a function of the angle $\phi$.

According to a further aspect of the invention, the lens includes two side portions that have an eccentricity that varies continuously as a function of the angle $\phi$ and top and bottom portions that have a substantially constant eccentricity as a function of the angle $\phi$.

The lens of the present invention has several advantages over prior lenses including an enhanced visual acuity at near and distance powers. In addition, the present invention overcomes the add power problem of previous aspheric lenses while retaining the advantages of an aspheric lens, i.e., to provide an intermediate vision capability.

These and other aspects and features of the invention will be further understood when considered in conjunction with the following detailed description of the embodiments of the invention.

DETAILED DESCRIPTION OF THE DRAWINGS AND THE PREFERRED EMBODIMENTS

The invention has presently found particular application as a lens for vision correction. However, the invention is considered to have far ranging applications and potential adaptations and should not be so limited.

Figure 1:
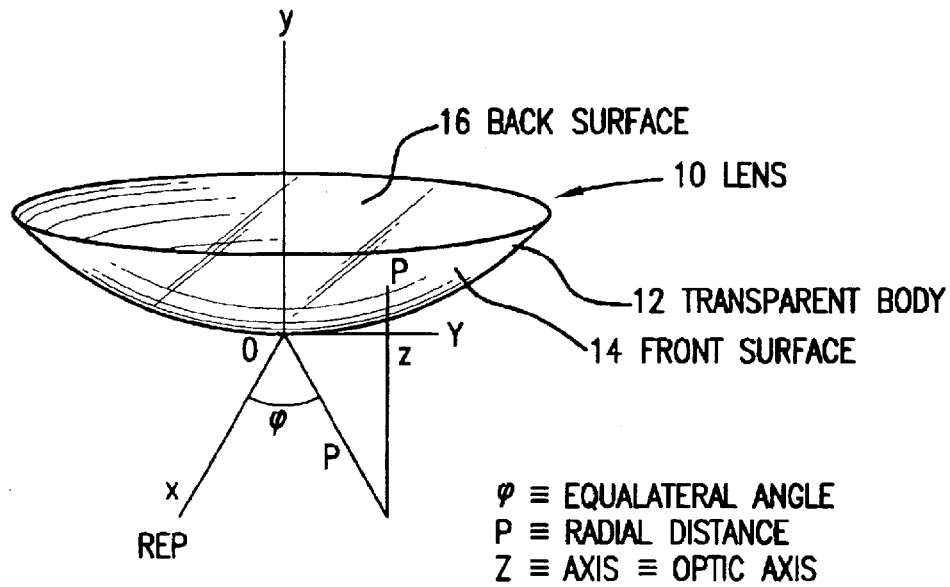
FIG. 1 illustrates a perspective view of an embodiment of the present invention and the cylindrical coordinate system $(\rho,\phi,z)$ used to describe the embodiment.

A preferred embodiment of the invention is shown in FIG. 1 as a contact lens 10. The lens 10 has an optically transparent body 12 with a front surface 14 and a back surface 16. The back surface 16 is basically concave shaped and is adapted to fit the curvature of the wearer's eye in a conventional manner. The front surface 14 includes an aspheric surface having an eccentricy e that varies continuously as a function of the equatorial angle φ across a portion of the lens.

To describe this eccentricity, reference is made to the cylindrical coordinate system depicted in FIG. 1. In FIG. 1 the z-axis is also the optical axis of the lens, and the orientation of the lens is such that it is concave in the direction of the positive z-axis. This particular orientation of the lens with respect to the z-axis in FIG. 1 is one which is commonly assumed for the programming of computer controlled lathes used in lens manufacture. Although other coordinate systems could be used, the cylindrical coordinate system chosen provides the advantage that standard forms for the conic sections may be used to specify the aspheric profile of the surface in terms of an angle dependent eccentricity variable e.

In the cylindrical coordinate system of FIG. 1 the position of an arbitrary point P is specified in terms of the parameters ρ, φ and z. The parameter ρ is the radial distance of the point from the z-axis. The parameter φ is the angle between the xz-plane and the plane that contains both the z-axis and the point P. The parameter z is the distance along the z-axis. These parameters may assume the following ranges of values:

$$-\infty \leq Z \leq \infty$$

$$0 \leq \rho \leq \infty$$

$$0° \leq \phi \leq 360°$$

Accordingly, the parameters ρ, φ and z can represent any point P on, or in, the lens 10.

For convenience, the origin O of the cylindrical coordinate system coincides with the apex of the front surface of the lens 10, and the z-axis coincides with the optical axis of the lens which can be offset from the geometrical axis. Then if we let:

$e = e(\phi) =$ eccentricity as a function of the angle $\phi$ $g = g(\phi) = 1 - e^2$ $j = j(\phi) = 1/g = 1/(1-e^2)$ $r_0 =$ apical radius of the aspheric surface = optical radius for the apical power then for any given value of $\phi$ the relationship between ρ and z may be expressed as follows:

(a) For the case where the front surface is aspheric and the center of the lens 10 has a focal power adapted for distance vision:

$$\rho^2 = 2r_0 z - jz^2$$

(where 0<e<1 and j>1)

with $$\rho = \rho(\phi, z) = (2r_0 z - jz^2)^{1/2}$$

and $$z = (\rho^2/r_0)/[1 + (1 - j\rho^2/r_0^2)^{1/2}]$$

and (b) For the case where the back surface is aspheric and the center of the lens 10 has focal power adapted for distance vision:

$$\rho^2 = 2r_0 z - gz^2.$$

with $$\rho = \rho(\phi, z) = (2r_0 z - gz^2)^{1/2}$$

and $$z = (\rho^2/r_0)/[1 - g\rho^2/r_0^2)^{1/1}]$$

As shown, the φ dependence of ρ(φ,z) in the above equations is determined entirely by the variables j or g which in turn are functions only of e(φ).

The present invention encompasses embodiments where the center of the lens has a power adapted for near vision or for distance vision. However, for illustration purposes, only the center distance embodiments will be discussed. The present invention also encompasses embodiments that have aspheric surfaces on either the front or back surface, or on both surfaces. Only the front surface configuration is illustrated in the embodiments discussed below.

Given the relationship between ρ and z, the following description is directed to three different embodiments, each using a different function e(φ). As those of ordinary skill in the art will recognize, other relationships between e and φ come within the scope of the present invention. For example, factors such as the desired additional near power, the centration and movement of the lens on the eye, and patient characteristics such as pupil size may lead to other preferred relationships between e(φ).

Figure 2:
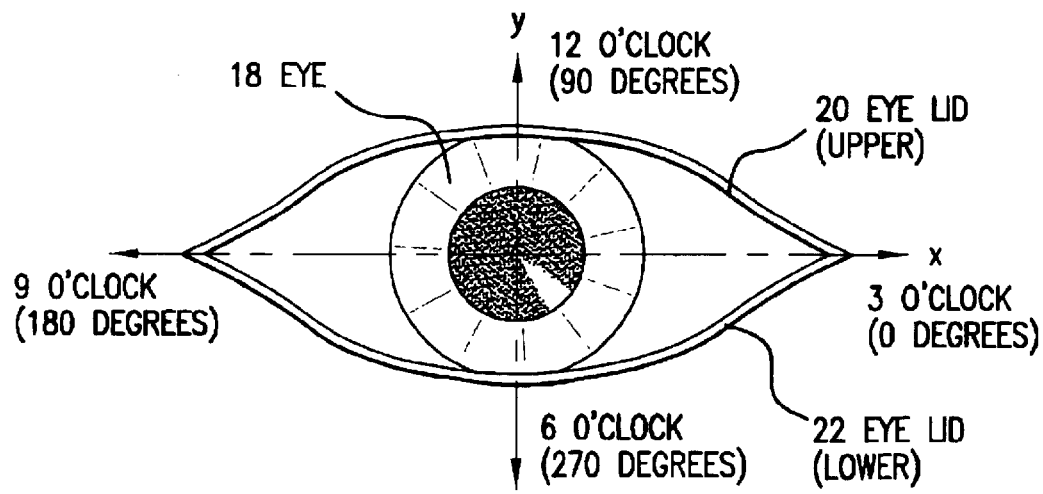
FIG. 2 illustrates an embodiment of the present invention positioned on an eye along with an angular coordinate system used to describe the embodiment.

For each of the embodiments, it is convenient and conventional to further describe an angular orientation with respect to the lens in terms of a clock face. FIG. 2 shows the lens 10 mounted on an eye 18 between the upper eyelid 20 and the lower eyelid 22. Looking at the front surface 14 of the lens 10 the 12 o'clock position is up, the 6 o'clock position is down, and the 3 o'clock and 9 o'clock positions are to the right and left respectively. In order to make the angle φ of FIG. 1 consistent with the ophthalmic system for specifying angular orientation with respect to the eye, the positive x-axis is placed at the 3 o'clock position and the positive y-axis is placed at the 12 o'clock position in FIG. 2. The positive z-axis is therefore pointing out of the patient's eye (i.e., out of the page) in FIG. 2. In contrast to FIG. 1 the lens on the eye is now concave in the direction of the negative z-axis. Fortunately, this difference between the manufacturing system of FIG. 1 and the ophthalmic system of FIG. 2 is not a source for confusion, since only a change in the sign of z is required to switch from one system to the other.

In the first embodiment, the near correction will be concentrated in the 4 to 8 o'clock region with an eccentricity that is greater than approximately 0.8. The 10 to 2 o'clock region will have distance correction with an eccentricity that is less than approximately 0.8. And, over the entire lens 10, the eccentricity could be on average approximately 0.8. However, other eccentricity values can be implemented on a lens construed in accordance with the present invention.

The eccentricity changes continuously from its maximum value $e_{max}$ at 6 o'clock and its minimum value $e_{min}$ at 12 o'clock in the first embodiment. The function of $e(\phi)$ is described as follows:

$$e(\phi) = A - B\sin(\phi)$$

for φ=0° to 360° where the constants A and B are defined by $$A = (e_{max} + e_{min})/2$$

and $$B = (e_{max} - e_{min})/2$$

or $$e_{max} = e(270°) = A + B$$

and $$e_{min} = e(90°) = A - B$$

A second embodiment of the present invention has a configuration where the function $e(\phi)$ remains constant at its minimum value in the top half of the lens (from 9 o'clock to 12 o'clock to 3 o'clock) and the function $e(\phi)$ changes continuously (from 3 o'clock to 6 o'clock to 9 o'clock) to a maximum value at 6 o'clock. The second embodiment may offer a slightly better distance vision but slightly worse near vision than the first embodiment. The following equations define the function $e(\phi)$ for this embodiment:

$$e(\phi) = A$$

for φ=0° to 180°

$$e(\phi) = A - B\sin(\phi)$$

for φ=180° to 360° where the constants A and B are defined by $$A = e_{min}$$

and $$B = e_{max} - e_{min}$$

or $$e_{max} = e(270°) = A + B$$

and $$e_{min} = e(90°) = A$$

The function $e(\phi)$ does not have to be sinusoidal to be cyclical in φ. A third embodiment has a configuration where the function $e(\phi)$ remains constant at its minimum value in a top region (from 10 o'clock to 12 o'clock to 2 o'clock) and remains constant at its maximum value in an inferior region (from 4 o'clock to 8 o'clock). In the nasal and temporal regions function $e(\phi)$ changes linearly between a maximum and a minimum level. The following equations describe the function $e(\phi)$ for this embodiment:

$$e(\phi) = e_{max} - (e_{max} - e_{min})(\phi + 30°)/60°$$

for φ=0° to 30°

$$e(\phi) = e_{min}$$

for φ=30° to 150°

$$e(\phi) = e_{min} + (e_{max} - e_{min})(\phi - 150°)/60°$$

for φ=150° to 210°

$$e(\phi) = e_{max}$$

for φ=210° to 330°

$$e(\phi) = e_{max} - (e_{max} - e_{min})(\phi - 330°)/60°$$

for φ=330° to 360°

The three sample functions for $e(\phi)$ presented above are expressed in terms of the quantities, $e_{max}$ and $e_{min}$. These quantities are functions of the distance power, the desired near Add power, the base curve, center thickness, and the refractive index of the lens material. To calculate a specific example for illustration purposes, the following baseline values are used:

Base Curve 8.800 mm

Center Thickness 0.130 mm

Refractive Index 1.412

Apical Back Vertex Power +1.00 D

Target Add for $e_{min}$ +1.25 D at a 1.6 mm half chord diameter

Target Add for $e_{max}$ +2.50 D at a 1.6 mm half chord diameter

Front Apical Radius 8.6539 mm

The 1.6 mm half chord diameter (the distance from the center axis to a point on the surface) corresponds to a 3.2 mm pupil diameter. The front apical radius value is what is needed to provide the chosen apical back vertex power.

Figure 3:
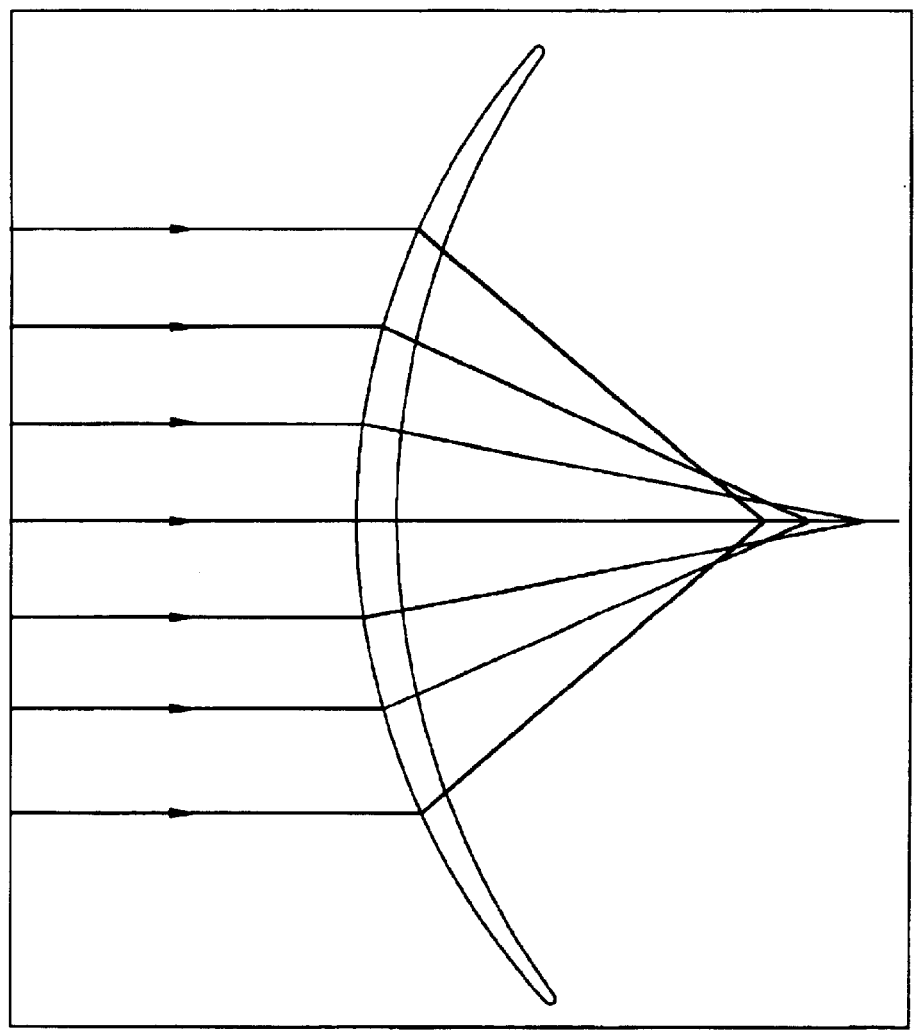
FIG. 3 is a diagram illustrating a ray tracing method used in the calculation of the Add power as a function of half chord diameter.
Figure 4:
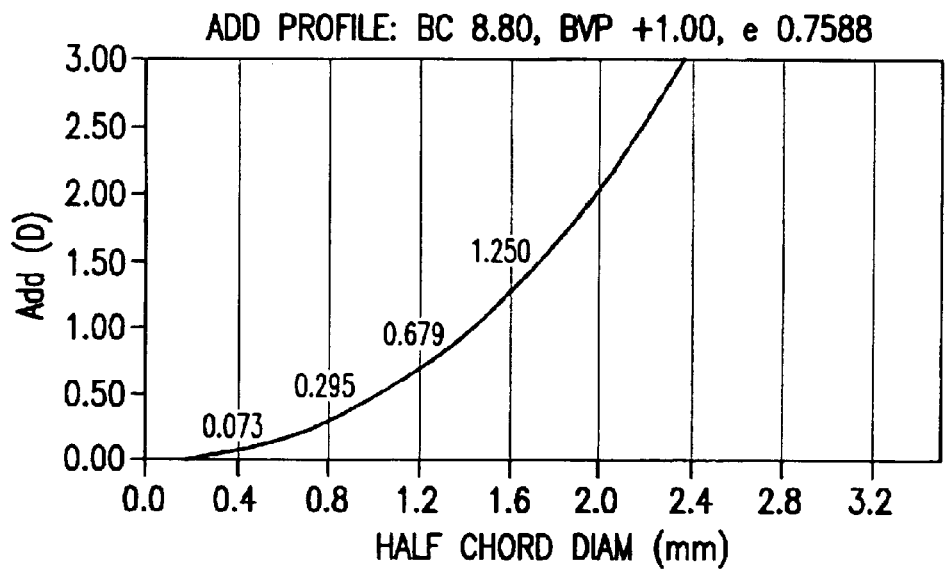
FIG. 4 is a graph showing the Add power as a function of the half chord diameter for $e_{min}$ for a first embodiment (BC represents base curve; BVP represents back vertex power; e represents eccentricity; D represents Diopter)
Figure 5:
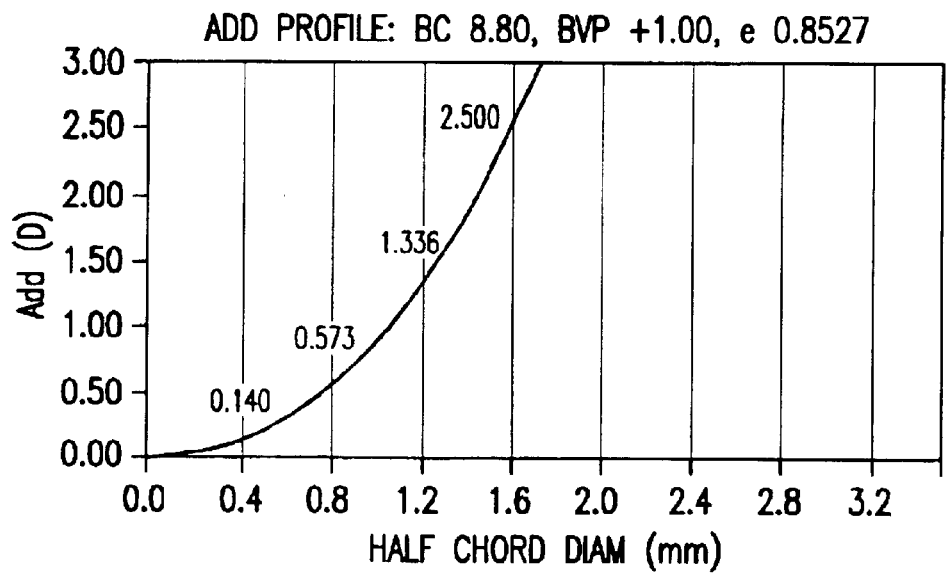
FIG. 5 is a graph showing the Add power as a function of the half chord diameter for $e_{max}$ for a first embodiment (BC represents base curve; BVP represents back vertex power; e represents eccentricity; D represents Diopter)

The Add power may be found by various methods such as by direct mathematical computation, by graphical construction, by ray tracing, and the like. For example, applying the baseline values above to the aspheric front surface distance center configuration, the Add power as a function of half chord diameter may then be computed by tracing rays for an axial object at infinity as shown in FIG. 3. The eccentricity of the front surface is then adjusted until the desired Add power is achieved. For example, $e_{min}$ =0.7588 provides a +1.25 D Add power at a 1.6 mm half chord diameter. Similarly, $e_{max}$ =0.8527 provides a +2.50 D Add power at the same 1.6 mm half chord diameter. The Add power profiles found by ray tracing for these values of $e_{max}$ and $e_{min}$ at other half chord diameters are plotted in FIGS. 4 and 5.

Figure 6:
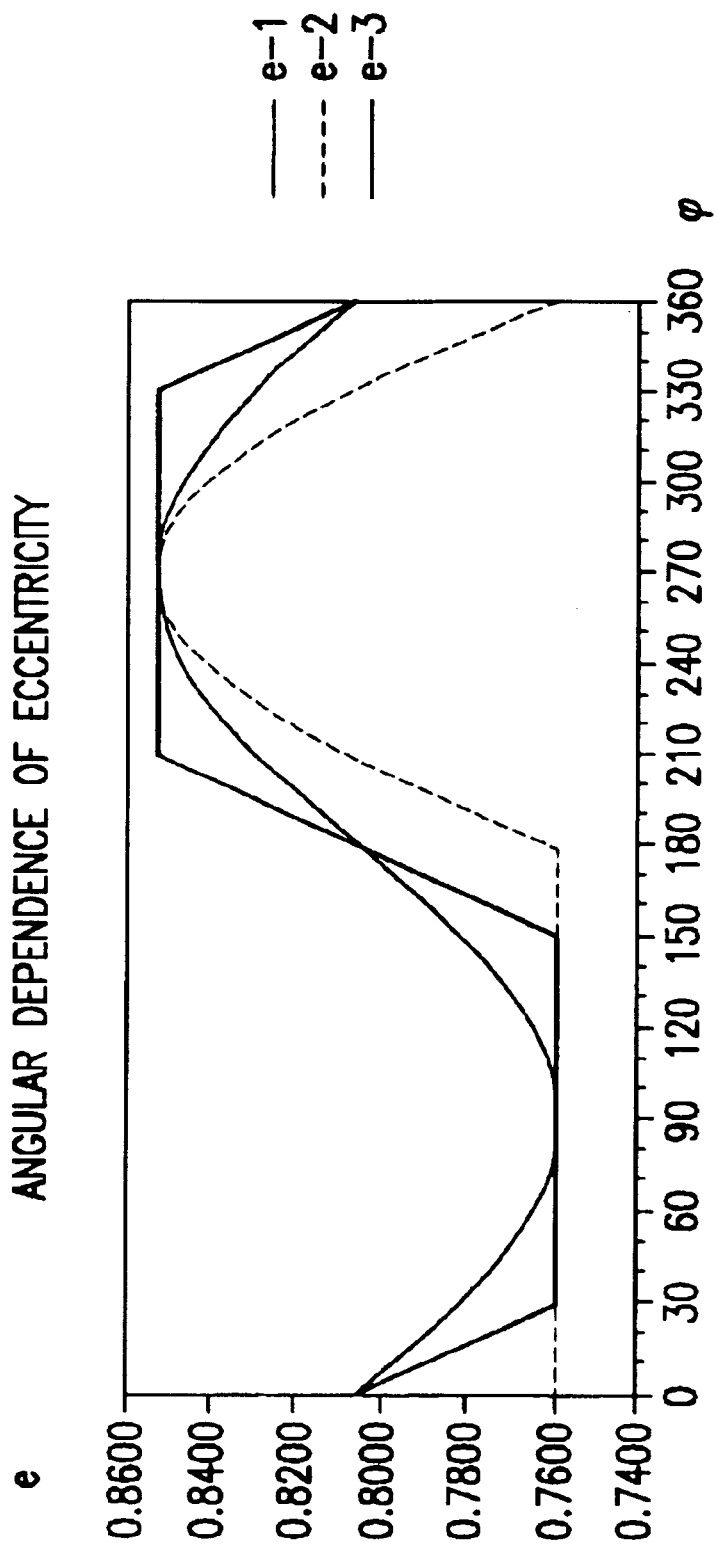
FIG. 6 is a graph showing the angular dependence of eccentricity for first, second and third embodiments of the present invention (e–1 represents the eccentricity in the first embodiment; e–2 represents the eccentricity in the second embodiment; e–3 represents the eccentricity in the third embodiment; φ represents the equatorial angle)

The angular dependence of the functions $e(\phi)$ for the three embodiments are illustrated in FIG. 6. In FIG. 6, all three functions are calculated for the same values of $e_{max}$ and $e_{min}$, hence, all have the Add power profiles shown in FIG. 4 for 12 o'clock and in FIG. 5 for 6 o'clock. As stated previously, the appropriate function $e(\phi)$ depends on several factors and must be selected based on the particular application. Factors such as ease of manufacture, cost and overall lens performance should be considered. For example, the second embodiment may offer slightly better distance vision but at the cost of slightly worse near vision than the first embodiment. It may be desirable to simplify the angle dependence further for the sake of manufacturing ease or cost. Thus, the result of the sinusoidal function in $e(\phi)$ might be approximated by a sinusoidal function in $\rho$ which is expressed in terms of $\rho_{max}$ and $\rho_{min}$ instead of $e_{max}$ and $e_{min}$.

Figure 7:
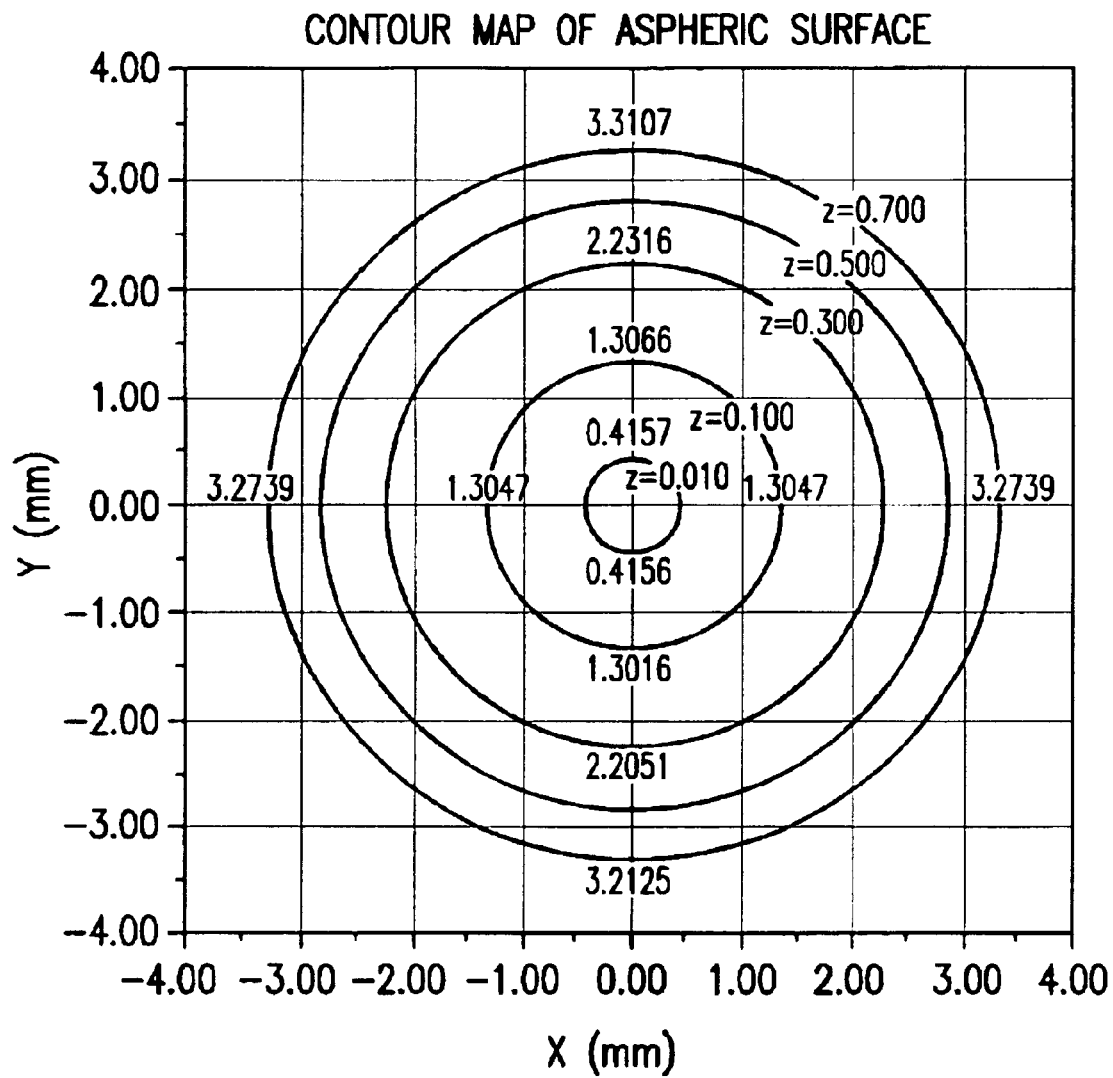
FIG. 7 is a contour map of the aspheric surface according to an embodiment of the present invention.

The aspheric surface resulting from the first functional relationship, $e(\phi)=A-B \sin(\phi)$, is represented by a contour map in FIG. 7. To obtain the contours in the figure, the cross-section of the aspheric surface is plotted in the XY plane for constant values of z. Note that the variation of $\rho$ with $\phi$ is small and that all of the contours in the figure may appear to be circles. However, they are not circles. To better illustrate that the contours actually deviate slightly from perfect circles, a few sample values of $\rho$ are also given. At $z=0.100$ mm it may be seen that $\rho$ is 1.3066 mm at 12 o'clock and 1.3016 mm at 6 o'clock. Thus, the difference between the maximum and minimum value of $\rho$ is only 5 microns at this value of z. Near the apex, at $z=0.010$ mm, the difference between the maximum and minimum $\rho$ is only a tenth of a micron, while at $z=0.700$ mm the difference is about 100 microns. This value of z corresponds to an aspheric optical zone of roughly 6.6 mm.

Lenses employing the present invention may be made on conventional manufacturing equipment such as a lathe. If a lathing process is used, then the axis of the spindle is most conveniently the Z-axis of the cylindrical coordinate system of FIG. 1, and the position of the cutting tool during lathing is given by $\rho(\phi,z)$. During each revolution of the spindle the cutting tool must alternately move closer to and farther from the spindle axis as it cycles through the minimum and maximum $\rho$ values for the current value of z. As discussed above for the surface in FIG. 7, the magnitude of the excursion of the cutting tool over its range of values during each rotation cycle is only a fraction of a micron near the apex of the surface. At larger z values, the magnitude of the excursion of the cutting tool increases to something on the order of 100 microns or more depending on the size of the aspheric optical zone.

Although specific values for refractive index, base curve, center thickness, back vertex power, and Add power targets are given for the sample lens computation discussed above, the form of the equations and the method of calculation is general and can be applied to other values. One method of manufacturing the present invention is to select an existing sphere or toric lens series and then graft the desired aspheric optical zone onto the front surface. In this approach the main computational task for each member of the lens series will be to calculate the required $e_{max}$ and $e_{min}$ values which provide the desired Add powers.

It may be desirable to evaluate a range of values for $e_{max}$ and $e_{min}$ to investigate the relationship between the calculated power, the measured power, and the clinical power effect. In the above discussion, the calculated apical power is used as a designation for the distance power. However, since the power changes continuously with the aspheric profile, it is possible that the clinical distance power effect is somewhat more plus (or less minus) than the apical power. Also, the designated Add power in the above discussion is based arbitrarily on the calculated Add power at a 1.6 mm half chord diameter. The useful attainable Add power is limited by the degree of asphere-induced image degradation that most wearers will accept.

The lens body 12 can be constructed from material to form a hard, gas permeable, or soft contact lens. While the size of lens may be adjusted to suit a wearer's eye size, the preferred outer diameter is within the range of approximately 8.0 mm to 15.5 mm. The aspheric surface can be on the front or back surfaces or both. The power can be center distance or near. And, if needed a toric feature may be added to one of the surfaces. In the described preferred embodiments the asphericity is on the front surface, the toric surface, if required, would be on the base curve, and the center of the lens 10 is designed for distance correction with the peripheral part of the optical zone designed for near correction.

To provide the necessary stabilization to orient the region of maximum Add power at the 6 o'clock position on the eye, any of a number of methods to prevent lens rotation may be used. For example, a conventional prism ballast may be used to achieve rotational stability.

In manufacturing embodiments of the present invention, coordinate systems are chosen by convention, and the system adopted for this discussion is selected primarily because the equations for $\rho(\phi,z)$ can then be written in a very concise form. Since the function $e(\phi)$ may be selected such that it is smooth and continuous over the whole surface, machining should not be difficult. Machining of the lenses can be done directly using a fast tool servo system. Suitable machines are provided by Moore and Rank-Pneumo. Lenses may also be formed by molding starting from masters which are manufactured according to the disclosed mathematical functions to drive the tooling. An alternate mathematical formulation is to use spherical harmonics or other appropriate expansion that provides a series expansion in terms of an amplitude moderated by an angular term. The equipment selected for the fabrication process may require a different coordinate system, but once this is identified it should be relatively straightforward to perform the necessary transformations between the two systems.

The embodiments described above and shown herein are illustrative and not restrictive. The scope of the invention is indicated by the claims rather than by the foregoing description and attached drawings. The invention may be embodied in other specific forms without departing from the spirit of the invention. For example, linear and non-linear changes in eccentricity come within the scope of the present invention. Changes that come within the scope of the claims are intended to be embraced herein.

We claim:

1. A contact lens comprising:

a front surface and a back surface, one of the front surface and the back surface being an aspheric surface having an equatorial angle $\phi$ wherein an eccentricity of the aspheric surface varies continuously as a function only of the angle $\phi$, wherein the eccentricity varies according to the following equation:

$$e(\phi)=A-B\sin(\phi)$$

for $\phi=0°$ to $360°$ wherein the constants A and B are defined by $$A=(e_{max}+e_{min})/2$$

and $$B=(e_{max}-e_{min})/2$$

$$e_{max}=e(270°)=A+B$$

and $$e_{min}=e(90°)=A-B.$$

2. The contact lens of claim 1 wherein the aspheric surface is the front surface.

3. The contact lens of claim 2 wherein the aspheric surface is the back surface.

4. A contact lens comprising:

a top portion and a bottom portion having an equatorial angle $\phi$, the top portion having a constant eccentricity as a function of the angle $\phi$, the bottom portion having an eccentricity that varies continuously as a function only of the angle $\phi$.

5. The contact lens of claim 4 wherein the top portion has an eccentricity to provide a distance correction power and the bottom portion has an eccentricity to provide, in part, a near correction power.

6. The contact lens of claim 5 wherein the near correction power has a maximum correction power where the angle $\phi$ is in the range 225°–315°.

7. The contact lens of claim 6 wherein the near correction power has a maximum correction power where the angle $\phi$ is 270°.

8. The contact lens of claim 7 wherein the eccentricity of the bottom portion varies by the function:

$$e(\phi)=A-B\sin(\phi)$$

for $\phi=180°$ to $360°$ wherein the constants A and B are defined by $$A=e_{min}$$

and $$B=e_{max}-e_{min}$$

$$e_{max}=e(270°)=A+B$$

and $$e_{min}=e(90°)=A.$$

9. The contact lens of claim 8 wherein the top portion and the bottom portion are on a back surface.

10. The contact lens of claim 8 wherein the top portion and the bottom portion are on a front surface.

11. The contact lens of claim 8 wherein the lens includes a ballast.

12. A contact lens comprising:

a top portion and a bottom portion, and two opposite side portions, the top portion having a first eccentricity along a selected arc, the bottom portion having a second eccentricity different from the first eccentricity a long the selected arc and the side portions having an equatorial angle $\phi$ and an eccentricity that that varies continuously as a function of the angle $\phi$ along the selected arc.

13. The contact lens of claim 12 wherein the top portion has an eccentricity that provides a distance correction power and the bottom portion has an eccentricity that provides a near correction power.

14. The contact lens of claim 13 wherein the first side portion is found at $\phi=150°$ to $210°$ and the second side portion is found at $\phi=330°$ to $360°$ and $0°$ to $30°$.

15. The contact lens of claim 14 wherein the eccentricity of the side portion varies according to the following equations:

$$e(\phi)=e_{max}-(e_{max}-e_{min})(\phi+30°)/60°$$

for $\phi=0°$ to $30°$ $$e(\phi)=e_{max}+(e_{max}-e_{min})(\phi-150°)/60°$$

for $\phi=150°$ to $210°$ $$e(\phi)=e_{max}-(e_{max}-e_{min})(\phi-330°)/60°$$

for $\phi=330°$ to $360°$.

16. The contact lens of claim 15 wherein the top portion and the bottom portion are on a front surface.

17. The contact lens of claim 16 wherein the lens includes a prism ballast.

18. A contact lens comprising:

a front surface and a back surface, one of the front surface and the back surface being an aspheric surface having an equatorial angle $\phi$ wherein an eccentricity of the aspheric surface varies continuously as a function of the angle $\phi$, wherein a near correction power is located between 30°–150° and a distance correction power is located between 210°–330°.

* * * * *